(No Model.)  E. M. BENTLEY.  2 Sheets—Sheet 2.
ELECTRIC LOCOMOTIVE.

No. 377,229.  Patented Jan. 31, 1888.

WITNESSES
G. Renault
Geo. T. Blackwell

INVENTOR
Edward M. Bentley
by Blakely & Knight
att'ys

UNITED STATES PATENT OFFICE.

EDWARD M. BENTLEY, OF NEW YORK, N. Y.

ELECTRIC LOCOMOTIVE.

SPECIFICATION forming part of Letters Patent No. 377,229, dated January 31, 1888.

Application filed July 30, 1887. Serial No. 245,759. (No model.)

*To all whom it may concern:*

Be it known that I, EDWARD M. BENTLEY, a citizen of the United States, residing at New York, in the county of New York, State of New York, have invented certain new and useful Improvements in Electric Locomotives, of which the following is a specification.

My invention relates to a method of attaching an electric motor to a vehicle propelled thereby; and it consists in gearing the motor to a single axle, while at the same time it is supported on a framing outside the axle, so that its whole weight rests on the axle, and thereby increases the tractive power of the vehicle.

Figure 1:
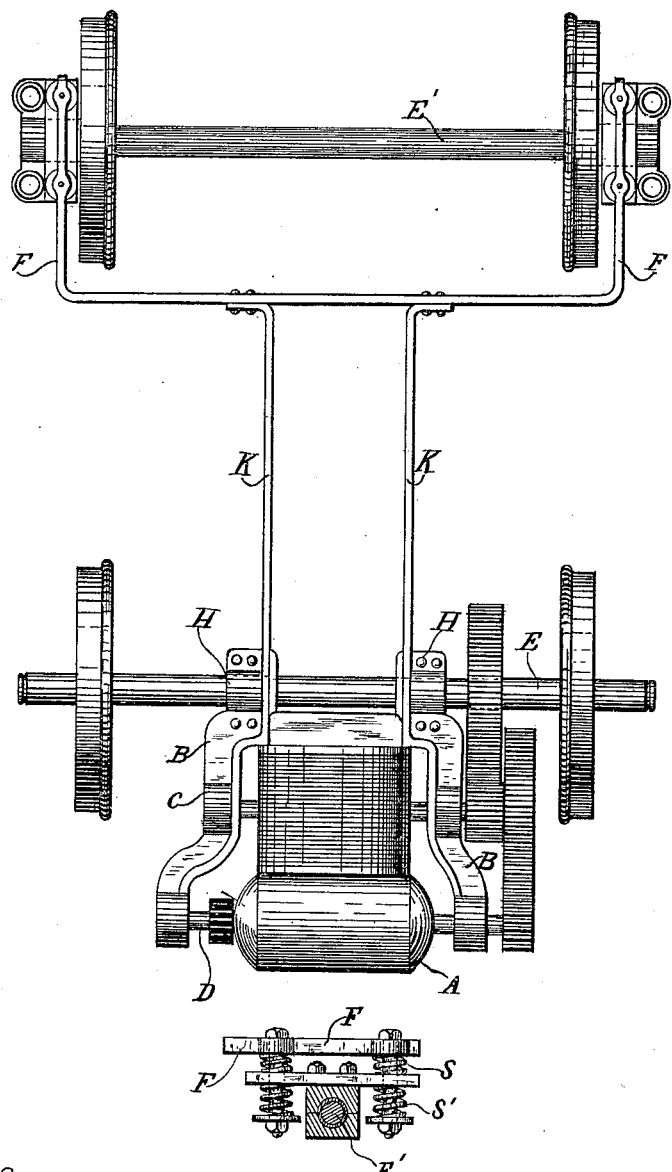

In Figure 1 of the accompanying drawings, A represents the motor. B is a framing extending from the yoke of the motor and supporting the armature-shaft D and the counter-shaft C. This frame is journaled on the axle E at H H, and has an extension, K F, projecting across to the journal-boxes of the opposite axle, E', and secured to them through intermediate springs, S S', one in the line of upward and the other in the line of downward pressure of F.

Figure 2:
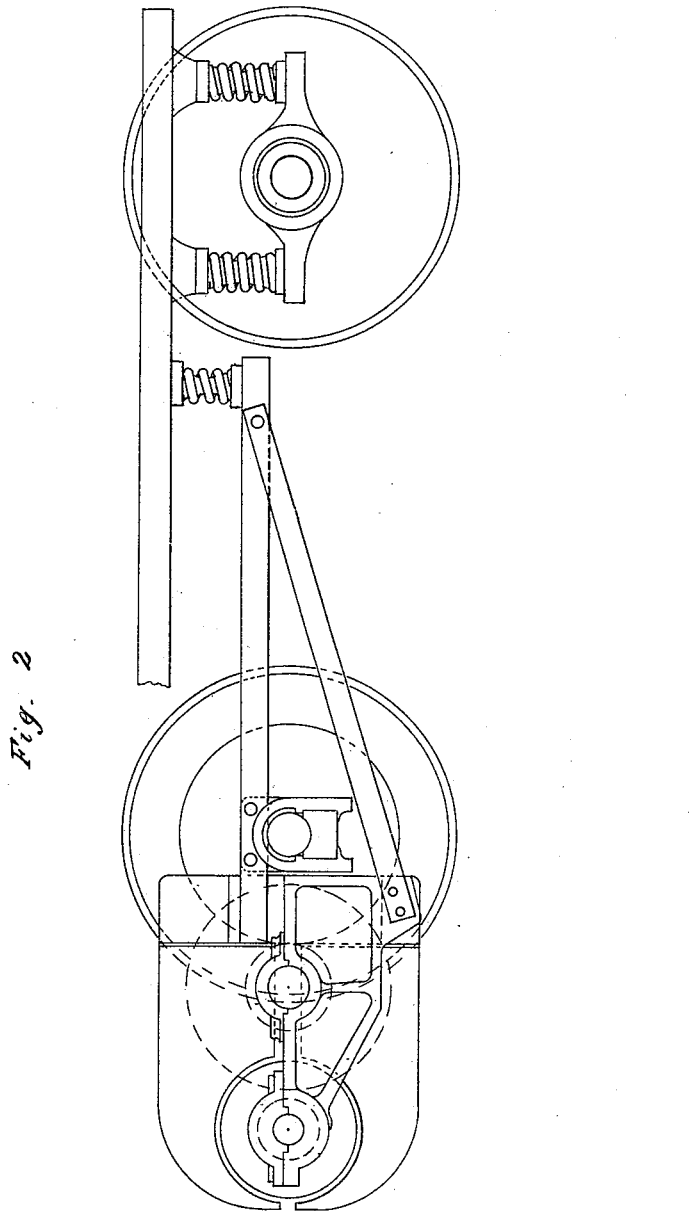

The motor is geared to the axle E, as shown, and it will be seen, the motor being fulcrumed on one side of the axle and counterbalanced on the opposite side by means of the other axle, that axle E receives all the weight of the motor and also a part of the weight normally falling on the other axle. The car-body is supported from the truck by springs in the usual manner. A chain or connecting-rods may go to the other axle, if necessary, and the car-body itself may be used to counterbalance the motor, as shown in Fig. 2 of the drawings.

I claim—

1. The combination, in an electric locomotive, of a motor geared to an axle of the vehicle and fulcrumed thereon so that its center of gravity falls on one side of the axle, with means for counterbalancing it on the opposite side of the axle.

2. The combination, in an electric locomotive, of a motor geared to an axle of the vehicle and fulcrumed thereon so that its center of gravity falls on one side of the axle, with means for spring counterbalancing it on the opposite side of the axle.

3. The combination, in an electric locomotive, with a motor resting directly on the axle without the intervention of springs and fulcrumed thereon, substantially as described, of a gear-connection between the motor and axle, and means for counterbalancing the motor on the opposite side of the axle.

4. The combination, in an electric locomotive, of a motor rigidly framed with the axle and geared thereto, journal-boxes in the framing resting upon the axle so that the center of gravity of the motor falls at one side of the axle, and means for counterbalancing the motor, so that the adhesive power of the locomotive may be increased.

5. The combination, in an electric locomotive, of a motor geared to an axle and fulcrumed thereon so that its center of gravity falls on one side of the axle, a transverse bar between opposite journal-boxes, and a counterbalancing-connection from the motor to said bar.

EDWARD M. BENTLEY.

Witnesses:
G. RENAULT,
JULIEN M. ELLIOT.